Nov. 3, 1925.

J. B. CASTINO 1,560,039

SPOTLIGHT

Filed July 26, 1924

Inventor:
John B. Castino.
By:
Atty.

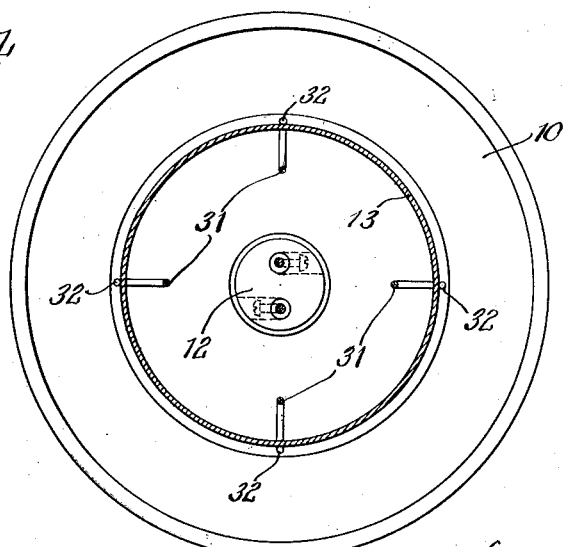
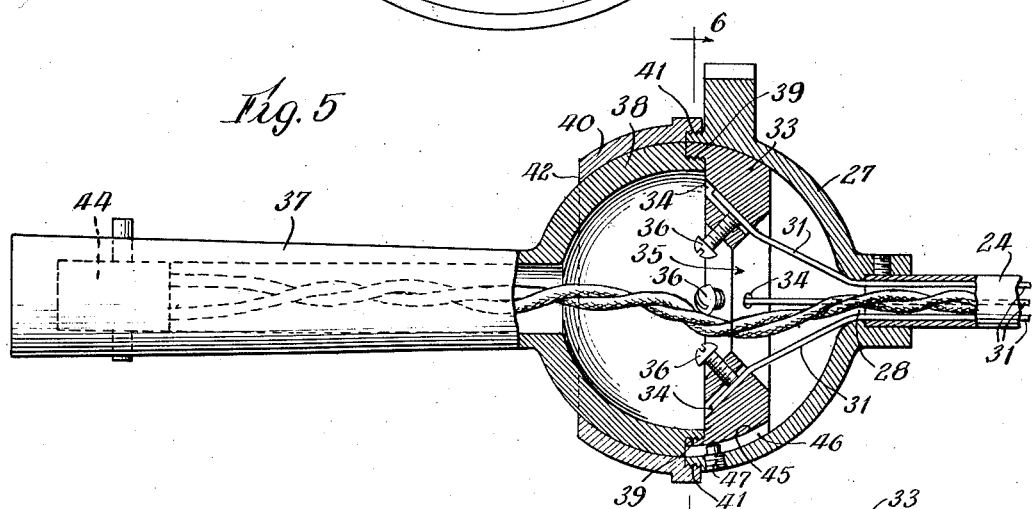
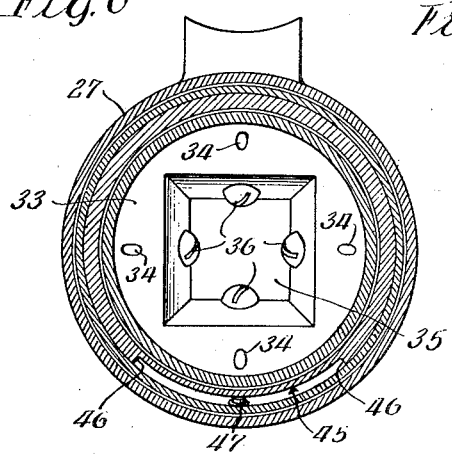
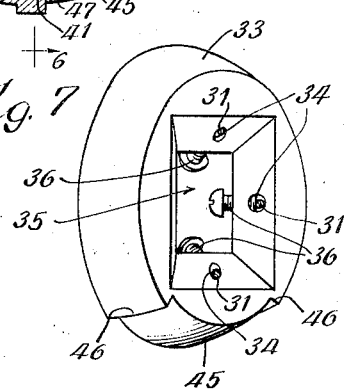

Patented Nov. 3, 1925.

1,560,039

UNITED STATES PATENT OFFICE.

JOHN B. CASTINO, OF CHICAGO, ILLINOIS.

SPOTLIGHT.

Application filed July 26, 1924. Serial No. 728,289.

*To all whom it may concern:*

Be it known that I, JOHN B. CASTINO, a citizen of the United States, residing at Chicago, in the county of Cook and State of Illinois, have invented certain new and useful Improvements in Spotlights, of which the following is a specification.

This invention relates to improvements in dirigible spot lights adapted to be attached to an automobile at any convenient point, preferably in advance of the hood, and one of the objects of the invention is to provide a light of this character having improved means whereby the light may be controlled or manipulated, from a point remote from the light.

A further object is to provide an improved light of this character which is adapted for universal movement and in which the operating parts are concealed and protected.

A further object is to provide an improved light of this character in which the actuating means therefor includes cables or wires, and improved means whereby the slack of the wires or cables may be taken up, or the tension thereof adjusted without necessitating a complete dismantling of the parts.

To the attainment of these ends and the accomplishment of other new and useful objects as will appear, the invention consists in the features of novelty in substantially the construction, combination and arrangement of the several parts hereinafter more fully described and claimed and as shown in the accompanying drawings illustrating the invention, and in which drawings, Figure 1, is a side elevation of an automobile partly broken away and having a light constructed in accordance with the principles of this invention applied thereto.

Figure 4, is a sectional view on line 4—4 Figure 3.

Figure 5, is a detail sectional view of a portion of the operating mechanism and the operating handle.

Figure 6, is a sectional view on line 6—6 Figure 5.

Figure 7, is a detail perspective view of the anchor member for one end of the operating wires or cables.

Figure 1:
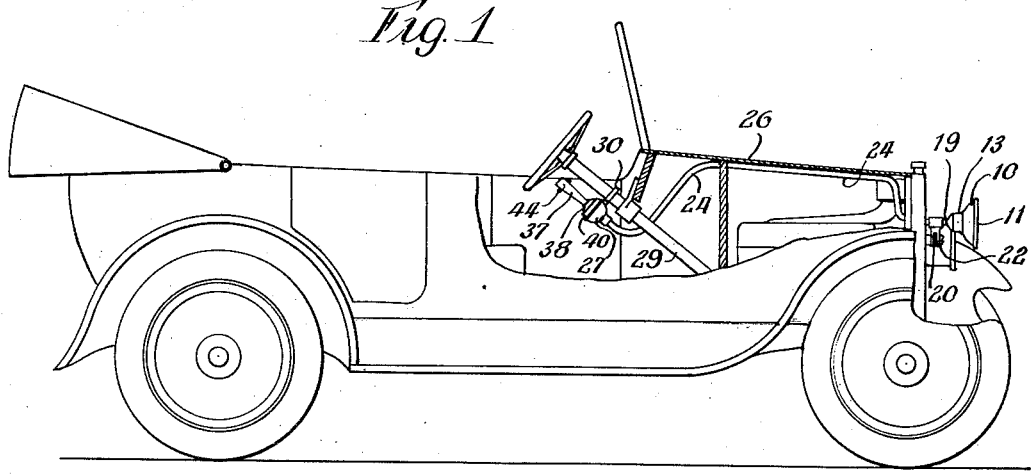
Figure 2:
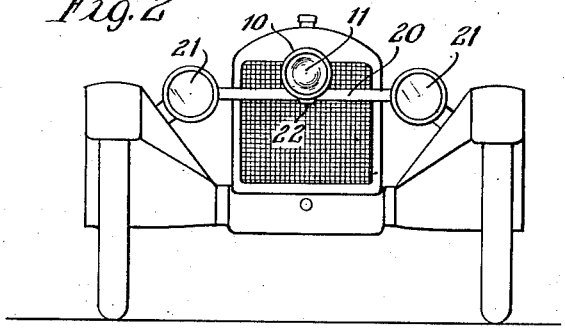
Figure 2, is a front elevation of Figure 1.
Figure 3:
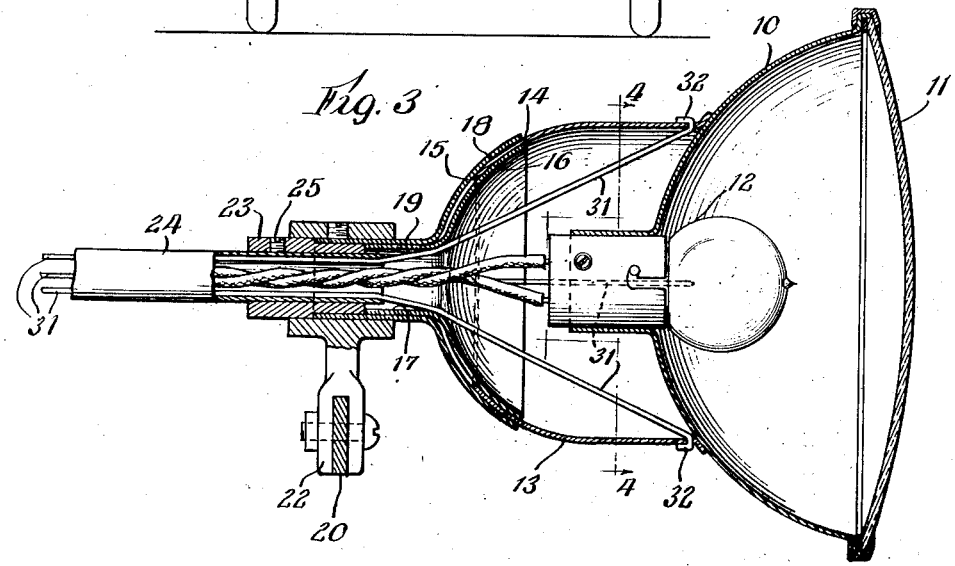
Figure 3, is an enlarged view partly in vertical section of the lamp and with parts of the operating mechanism omitted.

Referring more particularly to the drawings the numeral 10, designates the body or reflector portion of the lamp having a lens 11, and a light bulb 12. All of these parts may be of the ordinary and well known or of any suitable construction.

Connected with and projecting beyond the body portion 10, is a hollow or tubular extension the end 14, of which is of a rounded or semi circular configuration so that the extension will be of a dome like configuration.

The extremity of the projection 13, is cut away or apertured as at 15.

Within the extension 13, is a semi-cylindrical member 16, having a tubular stem 17, opening through the member 16. The opening 15, in the extension 13, is of a diameter considerably greater than the exterior diameter of the stem 17, so that the stem 17, which projects through the opening 15, to extend beyond the end 14, of the extension 13, will not interfere with a relative rocking and rotary movement of the end 14, of the extension 13, and the member 16.

Encompassing the end 14, of the extension 13, and resting thereagainst is a cup shaped member 18, which is preferably provided with a tubular stem 19, which telescopes with the stem 17, and these stems are secured or fastened together in any desired or suitable manner so that the members 16, and 18, will be fixed with respect to each other and will move in unison. The member 16, engages the inner face of the end 14, of the extension 13, and the member 18, engages the outer face thereof.

It will be manifest that inasmuch as these members 16, and 18, are fixed with respect to each other and as the end 14, of the extension 13, is disposed between and disconnected therefrom, the parts will be capable of relative movement one with respect to the other and the body portion 10, of the lamp will be supported and held in position. The diameter of the opening 15, being considerably greater than the external diameter of the tubular elements 17, 19, a universal movement may be given to the lamp and the support therefor, one with respect to the other.

The structure thus formed may be supported upon any part of the vehicle, the same being here shown connected with the tie rod or bar 20, which is usually found upon all automobiles between the head lights 21, by means of a suitable bracket or clamp 22.

A collar or sleeve 23, may be secured to the end of the telescoping stems 17, and 19, in any suitable manner and telescoping with this collar is one end of a flexible tubular member or conduit 24, which latter may be secured to the collar in any suitable manner preferably by means of a suitable fastening device 25.

The tubular member or conduit 24, may be of any desired length and extends backwardly, preferably under the hood 26, of the automobile, to a point convenient to the driver. The tube or conduit being flexible may be shaped so that it will assume and maintain any desired position.

Connected with the free end of the tube or conduit 24, is a cup shaped member 27, having an opening 28, registering with the opening in the member 24, and this member 27, may be anchored to any suitable support, such as the steering post 29, as shown more clearly in Figure 1, through the medium of a suitable bracket or clamping device 30, so that the member 27, and the tubular member or conduit 24, will be maintained stationary.

A plurality of cables, wires, or the like 31, are provided for swinging the light 10, with respect to its support. These cables are threaded through the tubular member or conduit 24, and one end of each cable is anchored as at 32, to the lamp 10, preferably to the wall of the extension 13, and are arranged on the inside of the extension.

Any number of these cables may be provided according to the directions in which it is desired to swing the lamp 10, four of such cables being here shown.

The other ends of the cables 31, extend into and terminate within the cup shaped member 27, and are anchored to a member 33, disposed within and fitting the member 27. The ends of the cables are threaded into separate apertures 34, in the walls of an opening 35, in the member 33, as shown more clearly in Figures 5, and 7.

Fastening devices 36, such as screws or the like are threaded through the walls of the apertures 34, and bind or grip the ends of the cables for securing the parts together. With this construction it will be manifest that when it is desired to take up the slack or adjust the tension of the cables 31, it is only necessary to loosen the particular screw or screws 36, grip the ends of the respective cables and draw them through the apertures 34. The screws may then be tightened and the ends of the cables may then be cut off. This not only forms a convenient and efficient means for adjusting the cables, but it will be noted that the cables assist in holding the member 33, in position.

A handle 37, is provided for manipulating the light and the handle is provided with a cup shaped extremity 38, which is threaded into the member 33, as at 39, and a collar 40, is detachably connected with the member 27, such as by means of threads 41.

The collar 40, encompasses the extremity 38, of the handle and has an opening 42, therein through which the handle projects, the diameter of the opening 42, is considerably less than the greatest diameter of the end 38, of the handle but is of a size to permit the handle to be freely moved, rotated and rocked with respect to the member 27, and the collar 40. The wall of the opening 42, serves as a stop for limiting the movement of the handle.

It will therefore be seen that inasmuch as the handle is connected with the member 33, which latter is connected with the cables 31, and as the member 33, and handle 37, are freely movable with respect to the member 27, the movement of the member 33, will draw upon the respective cables according to the direction of movement of the handle and thereby correspondingly rock the lamp 10, the tubular member 24, protecting and permitting the free movements of the cables 31.

When it is desired to gain access to the ends of the cables 31, the cap 40, is first detached from the member 27, after which the handle may be separated from the member 33, by unscrewing the same.

The conductor 43, leading from the light bulb 12, extends through the tubular member 24, and may be connected with a suitable switch 44, carried by the handle 37, in a convenient position for the operator and also so that it will not interfere with the free manipulation of the handle.

In order to prevent the axial rotation of the handle 37, to such an extent that damage might be done to the wires or cables, any suitable means may be provided to constitute a stop for the movement of the member 33. A suitable and efficient means for accomplishment of this end consists in shaping or cutting away a portion of the periphery of the member 33, as at 45, to form spaced shoulders 46, and a pin or projection 47, may be screwed through the member 27, so as to project into the cut away portion or space 45.

It will be manifest that when the member 33, is then rotated the extent of its rotary movement will be limited by the engagement of one or the other of the shoulders 46, with the pin or member 47.

With this invention there is provided an improved lamp which may be mounted upon any part of the vehicle and may be operated from a remote point through the medium of cables or flexible members and that by loosening the fastening devices 36, and grasping one end of the cables 31, they may be drawn through the apertures 34, in the member 33, to tighten them and thereby take up the slack.

Furthermore the lamp is adapted for universal adjustment and is of a compact and simple construction.

While the preferred form of the invention has been herein shown and described, it is to be understood that many changes may be made in the details of construction and in the combination and arrangement of the several parts within the scope of the claims without departing from the spirit of this invention.

What is claimed as new is;

1. In combination a lamp, a support therefor, a universal joint conne tion between the lamp and the said support, said joint having a passage therethrough an operating handle for imparting a universal movement to the lamp with respect to its support, said handle being detached from and remote from the lamp and support, and flexible elements operatively connecting the said handle with the lamp and extending through the said joint.

2. In combination a lamp, a support therefor, a universal joint connection between the lamp and its support, said joint having a passage therethrough, a housing remote from the lamp, a member arranged within the housing for universal movement with the respect thereto, flexible elements extending through the said joint and connected with the lamp and with the said member for imparting a corresponding movement to the lamp when said member is moved, and a handle connected with the said member.

3. A lamp, a support for the lamp, a universal joint connection between the lamp and its support and forming a part of the shell of the lamp, said joint having a passage therethrough, a plurality of flexible elements connected with the lamp for swinging it about the joint, and operating mechanism detached from and remote from the lamp and to which mechanism the flexible elements are adjustably connected for swinging the lamp, the said flexible elements passing through the said joint.

4. A lamp, a semi-cylindrical extension on the lamp, the crown of the extension having an opening, two co-operating semi-cylindrical members disposed adjacent opposite faces of the wall of said extension, said members being fixed with respect to each other and closely fitting the crown of said extension, a portion of one of said members being tubular and extending through the said opening and forming with the said extension a universal joint for the lamp, a support for the said members, and flexible elements connected with the lamp and extending through the said joint for swinging the lamp with respect to the said members.

5. A lamp, a semi-cylindrical extension on the lamp, the crown of the extension having an opening, two co-operating semi-cylindrical members disposed adjacent opposite faces of the wall of said extension, said members being fixed with respect to each other and closely fitting the crown of said extension, a portion of one of said members being tubular and extending through the said opening and forming with the said extension a universal joint for the lamp, a support for the said members, flexible elements connected with the lamp and extending through the said joint for swinging the lamp with respect to the said members, and a handle detached and remote from the said members and lamp and to which handle the said flexible elements are connected.

6. A lamp, a semi-cylindrical extension on the lamp, the crown of the extension having an opening, two co-operating semi-cylindrical members disposed adjacent opposite faces of the wall of said extension, said members being fixed with respect to each other and closely fitting the crown of said extension, a portion of one of said members being tubular and extending through the said opening and forming with the said extension a universal joint for the lamp, a support for the said members, flexible elements connected with the lamp and extending through the said joint for swinging the lamp with respect to the said members, a handle detached and remote from the said members and lamp, means adjustably connecting the said elements to the handle, and means mounting the handle for universal movement.

7. A lamp having a spherical extension, a support having a spherical bearing engaged by said extension, a spherical member engaging said extension, said member having a tubular portion extending through said extension and support, an immovable tubular casing secured by one extremity to the said support and registering with the said tubular portion of the said spherical member, a housing secured to the other end of the said tubular member, a handle, one end of the handle being connected with the said housing for universal movement with respect thereto and with respect to the said tubular casing, and flexible members secured by one end to the handle, said flexible members extending through the said tubular casing and the said support and secured by their other extremities to the lamp.

8. A lamp having a spherical extension, a support having a spherical bearing engaged by said extension, a spherical member engaging said extension, said member having a tubular portion extending through said extension and support, an immovable tubular casing secured by one extremity to the said support and registering with the said tubular portion of the said spherical member, a housing secured to the other end of the said tubular member, a handle, one end of the handle being connected with the said housing for universal movement with respect thereto and with respect to the said tubular casing, and flexible members secured by one end to the handle, said flexible members extending through the said tubular casing and the said support and secured by their other extremities to the lamp and within the said spherical extension.

9. A lamp having a spherical extension, a support having a spherical bearing engaged by said extension, a spherical member engaging said extension, said member having a tubular portion extending through said extension and support, an immovable tubular casing secured by one extremity to the said support and registering with the said tubular portion of the said spherical member, a housing secured to the other end of the said tubular member, a handle, one end of the handle being connected with the said housing for universal movement with respect thereto and with respect to the said tubular casing, flexible members secured by one end to the handle, said flexible members extending through the said tubular casing and the said support and secured by their other extremities to the lamp, the said handle including a member within the said housing and to which member the handle is detachably secured, and means for adjustably securing one end of the said flexible members to the said handle member.

10. A lamp having a spherical extension, a support having a spherical bearing engaged by said extension, a spherical member engaging said extension, said member having a tubular portion extending through said extension and support, an immovable tubular casing secured by one extremity to the said support and registering with the said tubular portion of the said spherical member, a housing secured to the other end of the said tubular member, a handle, one end of the handle being connected with the said housing for universal movement with respect thereto and with respect to the said tubular casing, flexible members secured by one end to the handle, said flexible members extending through the said tubular casing and the said support and secured by their other extremities to the lamp, the said handle including a member within the said housing and to which member the handle is detachably secured, means for adjustably securing one end of the said flexible members to the said handle member, and means co-operating with the last recited member for limiting the movements of the handle.

11. A lamp having a spherical extension, a support having a spherical bearing engaged by said extension, a spherical member engaging said extension, said member having a tubular portion extending through said extension and support, an immovable tubular casing extending from and registering with the said tubular portion of the said spherical member, a handle mounted for universal movement with respect to the tubular casing and adjacent the other end of the said tubular casing remote from the lamp, and flexible members extending through the said tubular casing, said flexible members being secured by one end to the lamp and by their other end to the said handle.

In testimony whereof I have signed my name to this specification, on this 8th day of July, A. D. 1924.

JOHN B. CASTINO.